United States Patent [19]
Luehrs

[11] 3,977,900
[45] Aug. 31, 1976

[54] THERMALLY ACTIVATED ELECTROCHEMICAL CELL INCLUDING AN ALKALI METAL SALT SOLVATE ELECTROLYTE

[75] Inventor: Dean C. Luehrs, Dollar Bay, Mich.

[73] Assignee: Board of Control of Michigan Technological University, Houghton, Mich.

[22] Filed: June 5, 1975

[21] Appl. No.: 583,897

[52] U.S. Cl. ............................. 136/83 T; 136/153; 136/155
[51] Int. Cl.² ..................................... H01M 6/04
[58] Field of Search .................. 136/83 T, 153, 155

[56] References Cited
UNITED STATES PATENTS

| | | | |
|---|---|---|---|
| 3,625,769 | 12/1971 | Lyall | 136/153 |
| 3,811,948 | 5/1974 | Bald | 136/153 |
| 3,812,039 | 5/1974 | Miwa | 252/62.2 |
| 3,819,415 | 6/1974 | Benderly et al. | 136/83 T |

Primary Examiner—Donald L. Walton

[57] ABSTRACT

The thermally activated electrochemical cell includes a cathode, an anode and a solid electrolyte which is non-conductive at ambient temperatures and is capable of becoming an ionically conductive liquid upon being heated above its melting point. The electrolyte is an organic solvent solvate of certain alkali metal salts which is formed by coordinating the salt with a polar organic solvent preferably having a Gutmann donor number greater than 18 and a dielectric constant of at least 20.

6 Claims, No Drawings

THERMALLY ACTIVATED ELECTROCHEMICAL CELL INCLUDING AN ALKALI METAL SALT SOLVATE ELECTROLYTE

BACKGROUND OF THE INVENTION

This invention relates to thermally activated electrochemical cells and more particularly to thermal activated electrochemical cells including a novel electrolyte system.

Thermally activated electrochemical cells or batteries have been used quite extensively in military applications, such as a power source for arming electronic ordnance fuses, and in fire detection devices because of their long shelf life and compactness. Batteries of this type typically include an electrolyte which, under normal storage conditions, is solid and does not conduct electricity. When the battery and/or the electrolyte is heated to a predetermined temperature, the electrolyte, upon changing to a molten or liquid state, becomes electrically conductive and cooperates with electrodes to provide the desired electromotive force.

The most widely used electrolytes for such batteries are inorganic salts or eutectic salt mixtures which typically melt at a temperature range of about 350 to 500° C. Because of their relatively high latent heat of fusion, these salts require a substantial period of heating before becoming molten or liquid. Also, in order to insure that these electrolytes remain in a molten or liquid state for the desired time interval, it is often necessary to heat them above their fusion or solution temperatures. Consequently, batteries using these electrolytes are not particularly adaptable for use in fire detection devices and, when used as the power source for arming ordnance devices, must be provided with substantial insulation to prevent loss of heat which can cause the salt to refreeze with a resultant premature deactivation of the battery.

Various mixtures and complexes of inorganic salts have been proposed for use as electrolytes in thermally activated batteries. Representative examples of such electrolytes are disclosed in U.S. Pat. Nos. 3,819,415 (Benderly et al), 3,811,948 (Bald), 3,764,385 (Langer et al) and 3,117,032 (Panzer). While eliminating many of the problems associated with inorganic salts or eutectic salt mixtures, these electrolytes still have certain shortcomings such as poor conductivity, excessively high melting points for many applications, melting points which vary over relatively wide ranges, etc.

SUMMARY OF THE INVENTION

The principal object of this invention is to provide a thermally activated electrochemical cell which is capable of being activated at a relatively low temperature.

Another object of this invention is to provide a thermally activated electrochemical cell including a solid electrolyte which is capable of melting and becoming an ionically conductive liquid within a relatively short time after being heated to a temperature above its melting point.

Other objects, advantages and aspects of the invention will become apparent upon reviewing the following detailed description and the appended claims.

The thermally activated electrochemical cell or battery provided by the invention includes a cathode, an anode and a normally solid electrolyte which is an organic solvent solvate of an alkali metal salt and is formed by coordinating the salt with a polar organic solvent. These solvates, which are crystalline coordination compounds and non-conductive at ambient temperatures and become an ionically conductive liquid upon being heated above their melting points, have sharp and relatively low melting points, have relatively low latent heats of fusion permitting them to become an ionically conductive liquid within a short time after being heated above their melting points, are compatible with most common electrode materials and have relatively low resistivities.

DESCRIPTION OF THE PREFERRED EMBODIMENTS

The organic solvent solvates used as the electrolyte in the thermally activated electrochemical cell or battery provided by the invention are formed by combining an alkali metal salt having a relatively small cation and a larger anion with a polar organic solvent to form a crystalline coordinated compound. For any particular application, the alkali metal salt must be compatible with the particular electrodes used in the cell and soluble in the general class of polar organic solvents described below. Alkali metal salts containing a fluoride anion generally are not acceptable because the anion is not large enough to obtain the desired crystalline coordination compound or solvate when combined with a polar organic solvent. Similarly, other alkali metal salts such as sodium chloride are not acceptable because the lattice energy is too great to obtain the formation of the desired solvate.

Acceptable alkali metal salts are selected from the group consisting of the bromides, iodides, thiocyanates, perchlorates, chlorates, nitrates, acetates, tetrafluoroborates, hexafluorophosphates, and hexafluoroantimonates of lithium and sodium, lithium chloride, potassium iodide, and potassium thiocyanate. At present, the preferred alkali metal salts are lithium chloride and lithium perchlorate with lithium chloride being the most preferred because of its high stability.

The polar organic solvents used to form the crystalline solvates used as the electrolyte preferably have a Gutmann donor number greater than that of water, i.e., 18. Solvents having a Gutmann donor number of at least 20 are more preferred and those having a Gutmann donor number of at least 25 are the most preferred. Also, the polar organic solvents preferably have a dielectric constant greater than 20.

Acceptable polar organic solvents are selected from the group consisting of hexamethylphosphoramide (HMPA), formamide, N-methylforamide, dimethylformamide (DMF), N-ethylformamide, diethylformamide, tetramethylurea (TMU), trimethylphosphate, triethylphosphate, tripropylphosphate, tributylphosphate, acetamide, dimethylacetamide, diethylacetamide, acetonitrile, acetone, pyridine, dimethylsulfoxide, diethylsulfoxide, dipropylsulfoxide, ethylene glycol, propylene carbonate, and lower alkyl alcohols containing 1 to 4 carbon atoms. At present, the preferred solvents are dimethylsulfoxide, diemthylacetamide, hexamethylphosphoramide and dimethylformamide.

The crystalline organic solvent solvates used as the electrolyte in this invention can be formed by dissolving the anhydrous alkali metal salt (which preferably has been dried under a vacuum at an elevated temperature of about 100° C or higher) in the pure organic solvent, heated to an elevated temperature, until the solution becomes saturated. After the solution is cooled to room temperature, the alkali metal salt solvate crystallizes out and the solvate is thereafter separated by filtering, washed with an inert hydrocarbon, such as benzene, to remove excess solvent and then dried, such as under a vacuum. For example, 20g (0.47 mole) of an anhydrous lithium chloride is dissolved in 90g (0.50 mole) of hexamethylphosphoramide (HMPA) heated to a temperature of 100° C. When the resultant solution is cooled to room temperature, white crystals of LiCl.HMPA crystallize out and these crystals are separated from the solution by filtering, washed with benzene and then dried under a vacuum.

The crystalline organic solvent solvates also can be formed by dissolving stoichiometric amounts of an anhydrous alkali metal salt and a coordinating polar organic solvent to form the desired solvate in a volatile, poorly coordinating solvent, such as acetone and methanol, and then removing the latter solvent by evaporation, such as under a vacuum. The resultant crystalline solvate can then be refined in the same manner described above. For example, 30g (0.435 mole) of lithium nitrate and 78g (0.435 mole) of HMPA are dissolved in methanol and the methanol evaporated off under a vacuum. After about a week, crystals of LiNO$_3$.HMPA form and these crystals can be separated by filtering, washed with benzene and then dried under a vacuum.

The alkali metal salt solvates are used as the electrolyte in an electrochemical cell or battery in their solid state. The invention relates primarily to the use of the above-described alkali metal salt solvates as the electrolyte system and the remaining components of the electrochemical cell or battery can be made in a conventional manner. Therefore, a detailed description and illustration of the structural features of the cell or battery are not believed necessary for a full understanding of the invention. For example, the cell or battery can be constructed in the manner disclosed in the above-identified U.S. Pat. No. 3,819,415 which is incorporated herein by reference.

More specifically, the battery includes an outer container, a cathode and an anode located in spaced relationship inside the container, and an alkali metal salt solvate is disposed between and in intimate contact with both the electrodes. The container is made from a non-conductive material which is resistant to the electrolyte, to moisture and to heat within the range of use. The alkali metal salt solvates of this invention generally are hygroscopic so the container must be sealed in a manner to prevent the ingress of moisture.

The anode can be made from a suitable conductive material, such as magnesium, calcium, zinc, cadmium, aluminum or the like, which is compatible with the electrolyte under operating conditions and the cathode is made from another suitable conductive material, such as nickel, iron, platinum, or the like, which is compatible with the electrolyte under operating conditions and is reactive with the anode to produce an electromotive force. The electrodes are provided in a conventional manner with connectors which extend externally of the container and serve as terminals for the battery. For some applications, it may be desirable to provide a suitable depolarizer coating, such as an oxide, sulfide, halide or sulfate of various metals, about the cathode or at least on the portion of the cathode facing the anode.

In order to insure that the electrolyte remains in intimate contact with both of the electrodes after it liquefies, upon being heated to a temperature above its melting point, an inert material, such as a fibrous or powdered packing, preferably is used in conjunction with the solid electrolyte. This material is packed into the area between the electrodes to prevent the liquid electrolyte from flowing away from contact with the electrodes. For activation, the battery can include any conventional heat source for generating sufficient heat to melt the electrolyte, such as a heat generating material or element located inside the container. When used in fire detection devices, the battery can be arranged so that it is activated by external heat.

Table I lists representative examples of solid electrolytes within the scope of the invention which were prepared by the methods outlined above. These alkali metal salt solvates were characterized by elemental analysis, melting point and IR spectra in accordance with the procedure described in Journal of Inorganic Nuclear Chemistry, Vol. 36, pp. 1459–60 (1974).

TABLE I

| Solvate | Melting Point, °C |
| --- | --- |
| LiCl · HMPA | 150 |
| LiBr · 4HMPA | 74 |
| LiSCN · HMPA | 180 |
| LiSCN · 2HMPA | 82 |
| LiClO$_4$ · HMPA | 128 |
| LiClO$_4$ · 4HMPA | 137 |
| LiNO$_3$ · HMPA | 65 |
| LiBF$_4$ · HMPA | 116 |
| NaI · HMPA | 154 |
| NaSCN · HMPA | 151 |
| NaSCN · 2HMPA | 77 |
| NaClO$_4$ · HMPA | 176 |
| NaClO$_4$ · 2DMF | 70 |
| NaSCN · 2DMF | 49 |
| LiNO$_3$ · DMF | 72 |
| LiClO$_4$ · 2TMU | 109 |
| LiCl · TMU | 63 |
| LiBr · TMU | 123 |
| LiSCN · TMU | 49 |
| NaClO$_4$ · 2TMU | 46 |
| 2NaI · 3TMU | 69 |

Of the solvates listed in Table I, LiBF$_4$.HMPA, NaI.HMPA, NaSCN.HMPA, NaSCN.2HMPA, NaClO$_4$.HMPA, NaSCN.2DMF, LiNO$_3$.TMV, LiCl.TMV, and 2NaI.3TUM while operable as an electrolyte, are presently considered to be less desirable because of their tendency to melt incongruently. It should be understood that the alkali metal salt solvates listed in Table I are only representative, and not all inclusive, of those which can be used as an electrolyte in accordance with the invention. However, from the melting points of those listed, it can be seem that electrochemical cells or batteries including such alkali metal salt solvates as the electrolyte can be thermally activated at relatively low temperatures and the activation temperature for a particular application can be varied as required by selecting the appropriate solvate.

From the foregoing description, one skilled in the art can easily ascertain the essential characteristics of this invention, and without departing from the spirit and scope thereof, can make various changes and modifications of the invention to adapt it to various uses and conditions.

I claim:

1. A thermally activated electrochemical cell including
   a cathode,
   an anode, and an electrolyte which is disposed between said cathode and anode, is an electrically non-conductive solid at ambient temperatures and is capable of becoming an ionically conductive liquid upon being heated above its melting point, said electrolyte comprising a crystalline coordination compound formed by the solvation of an alkali metal salt selected from the group consisting of the bromides, iodides, thiocyanates, perchlorates, chlorates, nitrates, acetates, tetrafluoroborates, hexafluorophosphates, and hexafluoroantimonates of lithium and sodium, lithium chloride, potassium iodide, and potassium thiocyanate with a polar organic solvent selected from the group consisting of hexamethylphosphoramide, formamide, N-methylformamide, dimethylformamide, N-ethylformamide, diethylformamide, tetramethylurea, trimethylphosphate, triethylphosphate, tripropylphosphate, tributylphosphate, acetamide, dimethylacetamide, diethylacetamide, acetonitrile, acetone, pyridine, dimethylsulfoxide, diethylsulfoxide, dipropylsulfoxide, ethylene glycol, propylene carbonate, and lower alkyl alcohols containing 1 to 4 carbon atoms.

2. A thermally activated electrochemical cell according to claim 1 wherein said solvent has a Gutmann donor number greater than 18 and a dielectric constant of at least 20.

3. A thermally activated electrochemical cell according to claim 1 wherein said alkali metal salt is lithium chloride or lithium perchlorate.

4. A thermally activated electrochemical cell according to claim 1 wherein said solvent is selected from the group consisting of dimethylsulfoxide, dimethylacetamide, hexamethylphosphoramide and dimethylformamide.

5. A thermally activated electrochemical cell according to claim 1 wherein said alkali metal salt is lithium chloride or lithium perchlorate and said solvent is selected from the group consisting of dimethylsulfoxide, dimethylacetamide, hexamethylphosphoramide and dimethylformamide.

6. A thermally activated electrochemical cell according to claim 5 wherein said alkali metal salt is lithium chloride.

* * * * *